(12) United States Patent
Geppert et al.

(10) Patent No.: US 9,399,918 B2
(45) Date of Patent: Jul. 26, 2016

(54) BLADE FOR A CONTINUOUS-FLOW MACHINE AND A CONTINUOUS-FLOW MACHINE

(71) Applicant: MTU Aero Engines AG, Munich (DE)

(72) Inventors: Johann Geppert, Tuerkenfeld (DE); Peter Eibelshaeuser, Munich (DE); Heinz Rauschmair, Munich (DE)

(73) Assignee: MTU Aero Engines GmbH, Munich (DE)

( * ) Notice: Subject to any disclaimer, the term of this patent is extended or adjusted under 35 U.S.C. 154(b) by 429 days.

(21) Appl. No.: 13/962,649

(22) Filed: Aug. 8, 2013

(65) Prior Publication Data

US 2014/0044553 A1 Feb. 13, 2014

(30) Foreign Application Priority Data

Aug. 9, 2012 (EP) .................................. 12179769

(51) Int. Cl.
| | | |
|---|---|---|
| *F03B 3/12* | (2006.01) | |
| *F01D 5/14* | (2006.01) | |
| *F01D 5/20* | (2006.01) | |
| *F04D 29/16* | (2006.01) | |
| *F04D 29/68* | (2006.01) | |
| *F04D 29/32* | (2006.01) | |

(52) U.S. Cl.
CPC ...... *F01D 5/141* (2013.01); *F01D 5/20* (2013.01); *F04D 29/164* (2013.01); *F04D 29/324* (2013.01); *F04D 29/681* (2013.01); *Y02T 50/673* (2013.01)

(58) Field of Classification Search
CPC ......... F01D 5/141; F01D 5/20; F04D 29/164; F04D 29/324
USPC .................................. 416/223 A, 223 R, 243
See application file for complete search history.

(56) References Cited

U.S. PATENT DOCUMENTS

| | | | |
|---|---|---|---|
| 899,319 A | 9/1908 | Stoney | |
| 5,456,576 A | 10/1995 | Lyon | |
| 5,476,363 A * | 12/1995 | Freling | F01D 5/20 205/110 |
| 6,358,012 B1 * | 3/2002 | Staubach | F01D 5/141 416/228 |
| 7,946,825 B2 * | 5/2011 | Tudor | F04D 29/668 416/223 A |
| 8,393,872 B2 * | 3/2013 | Kirtley | F01D 5/141 416/242 |
| 8,790,088 B2 * | 7/2014 | Dyer | F01D 5/20 416/223 R |
| 2008/0134504 A1 | 6/2008 | Schoenenborn | |
| 2011/0044800 A1 | 2/2011 | Cornelius et al. | |
| 2011/0097210 A1 * | 4/2011 | Kirtley | |
| 2012/0128480 A1 | 5/2012 | Gomez et al. | |

FOREIGN PATENT DOCUMENTS

| | | |
|---|---|---|
| DE | 4436186 | 5/1995 |
| DE | 69506890 | 8/1999 |
| DE | 9422418 U1 | 9/2001 |
| DE | 10 2005 006 414 A1 | 8/2006 |

(Continued)

*Primary Examiner* — Ching Chang
(74) *Attorney, Agent, or Firm* — Davidson, Davidson & Kappel, LLC

(57) ABSTRACT

A blade for a continuous-flow machine is disclosed, especially an aircraft engine, whereby, starting from the middle section, the cross section of the blade tip is reduced with respect to the middle section, at least over a front partial section in the direction of the leading edge and over at least a rear section in the direction of the trailing edge, and a continuous-flow machine having at least one row of blades including such blades is also disclosed.

13 Claims, 4 Drawing Sheets

(56) References Cited

FOREIGN PATENT DOCUMENTS

| | | |
|---|---|---|
| DE | 102009036406 | 2/2011 |
| EP | 1930547 | 6/2008 |
| GB | 2427659 | 1/2007 |
| JP | 08284884 | 10/1996 |
| WO | WO 2006/015899 | 2/2006 |

* cited by examiner

BLADE FOR A CONTINUOUS-FLOW MACHINE AND A CONTINUOUS-FLOW MACHINE

This claims the benefit of European Patent Application EP 12179769.0, filed Aug. 9, 2012 and hereby incorporated by reference herein.

The invention relates to a blade for a continuous-flow machine, and it also relates to a continuous-flow machine.

BACKGROUND

The tips of blades in continuous-flow machines, for example, of runner blades in aircraft engines, are regularly exposed to vibrational stresses. The vibrational stresses can manifest themselves, for example, in the form of cracks either in the armoring on the tip side and/or in the blade body. In order to reduce vibrational stresses in the blade tips, it has been long known to configure the blade tips with a tapered cross section with respect to adjacent blade sections. Such blade tips, also referred to as "squealer tips", are known in many variations and can be configured on both sides, that is to say, on the pressure side as well as on the suction side, or else only on one side, that is to say, for example, only on the pressure side. Thus, for instance, German utility model DE 9422418 U1 discloses the blade tip of a runner blade that is configured to be drop-shaped starting from a leading edge in the direction of a trailing edge. Here, its orientation is such that it is tapered in the direction of the trailing edge. International patent application WO 2006/015899 A1 describes the tip of a runner blade that has an edge web with a constant cross section extending from a leading edge to a trailing edge. German patent application DE 10 2005 006 414 A1 shows the blade tip of a blisk having only one pocket on the pressure side.

BRIEF SUMMARY OF THE INVENTION

These prior-art configurations of the blade tips translate into a reduction of the vibrational stresses in the area of the blade tip, but they still leave quite a bit of room for improvement.

It is an object of the present invention to provide a blade for a continuous-flow machine that brings about an effective reduction of vibrational stresses in the area of the blade tip. It is also an object of the present invention to provide a continuous-flow machine that attains improved efficiency.

The present invention provides a runner blade for a continuous-flow machine, especially an aircraft engine, having a blade with a leading edge and a trailing edge opposite from it, both of which extend in the main direction of the blade and are at a distance from each other in the lengthwise direction of the blade. Moreover, the blade has a pressure-side wall extending between the leading edge and the trailing edge as well as a suction-side wall that is opposite from the pressure-side wall. Furthermore, the blade has a tip that delimits the pressure-side wall and the suction-side wall in the main direction. According to the invention, starting from the middle section, the cross section of the blade tip is gradually reduced with respect to the middle section, in each case over at least a front partial section in the direction of the leading edge and over at least a rear partial section in the direction of the trailing edge.

Due to the decreasing tapering starting from the middle section in the direction of the leading edge and of the trailing edge, the cross sections of at least the partial sections are reduced with respect to the pressure-side wall and/or the suction-side wall. In particular, at least the partial sections have a varying crosswise extension or width as seen in the lengthwise direction. The blade tip becomes thinner in the direction of the leading edge and of the trailing edge, at least in the partial sections, as a result of which a maximum cross sectional tapering can be positioned close to the leading edge and to the trailing edge. Vibrational stresses in standing waves between the partial sections and the leading edge or the trailing edge are diminished. As a result, the runner blade according to the invention entails a low risk of cracking in the area of the blade tip and thus a longer expected service life than a conventional blade under the same operating conditions. Moreover, due to the reduced vibrational stresses, high-strength armoring such as cBn armoring (cubic crystalline boron nitride armoring) can be reliably applied.

In a preferred embodiment, the cross section of the middle section is likewise reduced with respect to the pressure-side wall and/or to the suction-side wall. As a result, the vibrational stresses can be further reduced. Preferably, the cross section of the middle section is likewise reduced in the direction of the leading edge and of the trailing edge.

Preferably, the cross sections of the middle section and of the two partial sections are reduced on both sides. Consequently, the middle section as well as the partial sections are stepped back with respect to the pressure-side wall and to the suction-side wall, as a result of which the middle section and the partial sections can be oriented symmetrically with respect to the neutral phase. Moreover, the partial sections can be configured to be very narrow in the direction of the leading edge and of the trailing edge, and especially the maximum cross section tapering can be situated very close to the neutral phase in each case.

From an aerodynamic point of view, it is advantageous for the middle section and the partial sections to form a wing-like profile. The middle section and the partial sections thus have a side surface on the pressure side and an opposite side surface on the suction side, whose distance tapers steadily starting from the middle section over to the partial sections in the direction of the leading edge and of the trailing edge.

For production reasons and also from an aerodynamic point of view, it is advantageous for the blade tip to have a front end section and a rear end section that make a transition into the leading edge and into the trailing edge respectively, and that each continue a blade profile course of the suction-side wall and of the pressure-side wall. In this manner, the end sections are not stepped back with respect to the suction-side wall and the pressure-side wall, and they have the original profile thickness or the original profile course.

From an aerodynamic point of view, it is also advantageous for the pressure-side wall and the suction-side wall to be maximized. In order to reduce vibrational stresses in the area of the blade tip, however, it is advantageous for the blade tip that is configured as a squealer tip to have a large extension in the main direction or height. Therefore, as a compromise between these two requirements, one embodiment provides that the side surface on the suction side and the side surface on the pressure side of the middle section as well as of the two partial sections each extend perpendicularly or almost perpendicularly from a stepped surface that runs orthogonally, or almost orthogonally, to the pressure-side wall and to the suction-side wall. The stepped surfaces do not contribute to the height of the blade tips so that the side surfaces can have the largest possible height. Since the side surfaces extend perpendicularly or almost perpendicularly from the stepped surfaces, the middle section and the partial sections have a constant width along their height. From the standpoint of structural mechanics, it is advantageous if a rounded section is formed between each of the stepped surfaces and the side surfaces. The rounded section preferably has a small radius.

In another embodiment, the side surfaces each extend from a slanted surface on the pressure side and from a slanted surface on the suction side. As a result, while the blade height remains unchanged, the side surfaces are indeed lower than in the preceding embodiment with the stepped surfaces, but this embodiment is practical from a manufacturing standpoint. Preferably, the pressure-side wall and the suction-side wall make a direct transition to the slanted surfaces. However, the slanted surfaces can also extend from the stepped surfaces.

In another embodiment, the side surfaces are configured as concave surfaces, as seen in a cross sectional view. Preferably, the pressure-side wall and the suction-side wall make a direct transition to the concave surfaces. However, a large radius is needed in order to achieve a sufficient cross sectional tapering, so that, if the blade height is unchanged by the relatively large radius, then the pressure-side wall and the suction-side wall are shortened in the main direction as compared to the preceding embodiments. As an alternative, the concave surfaces extend from stepped surfaces or slanted surfaces.

Preferably, the side surfaces are connected to each other, or the concave surfaces are connected to each other, at their ends via a planar surface. Such a planar surface can easily be provided with armoring.

The blade tip preferably has a constant extension in the main direction and thus a constant height. As a result, the middle section, the partial sections and the end sections have a uniform height, which has a favorable impact on the sealing of the radial gap in the area of the blade tip.

In alternative embodiments, the cross sections of the middle section and/or of the two partial sections are reduced only on one side. The middle section and/or the two partial sections are tapered either with respect to the suction-side wall or with respect to the pressure-side wall in the direction of the leading edge and of the trailing edge. The profile of the pressure-side wall or of the suction-side wall continues as seen from the rear of the tapering.

A preferred continuous-flow machine has at least one row of blades that is made up of the blades according to the invention. In particular, the blades are runner blades. Such a row of blades has blades whose vibrational stresses are reduced in the tip section as compared to conventional blades with tapered blade tips. As a result, the blades can withstand greater stress than the conventional blades, so that their service life can be increased and the efficiency of the continuous-flow machine can be improved.

BRIEF DESCRIPTION OF THE DRAWINGS

Below, preferred embodiments of the invention will be explained in greater detail with reference to schematic depictions. The following is shown.

DETAILED DESCRIPTION

Figure 1:
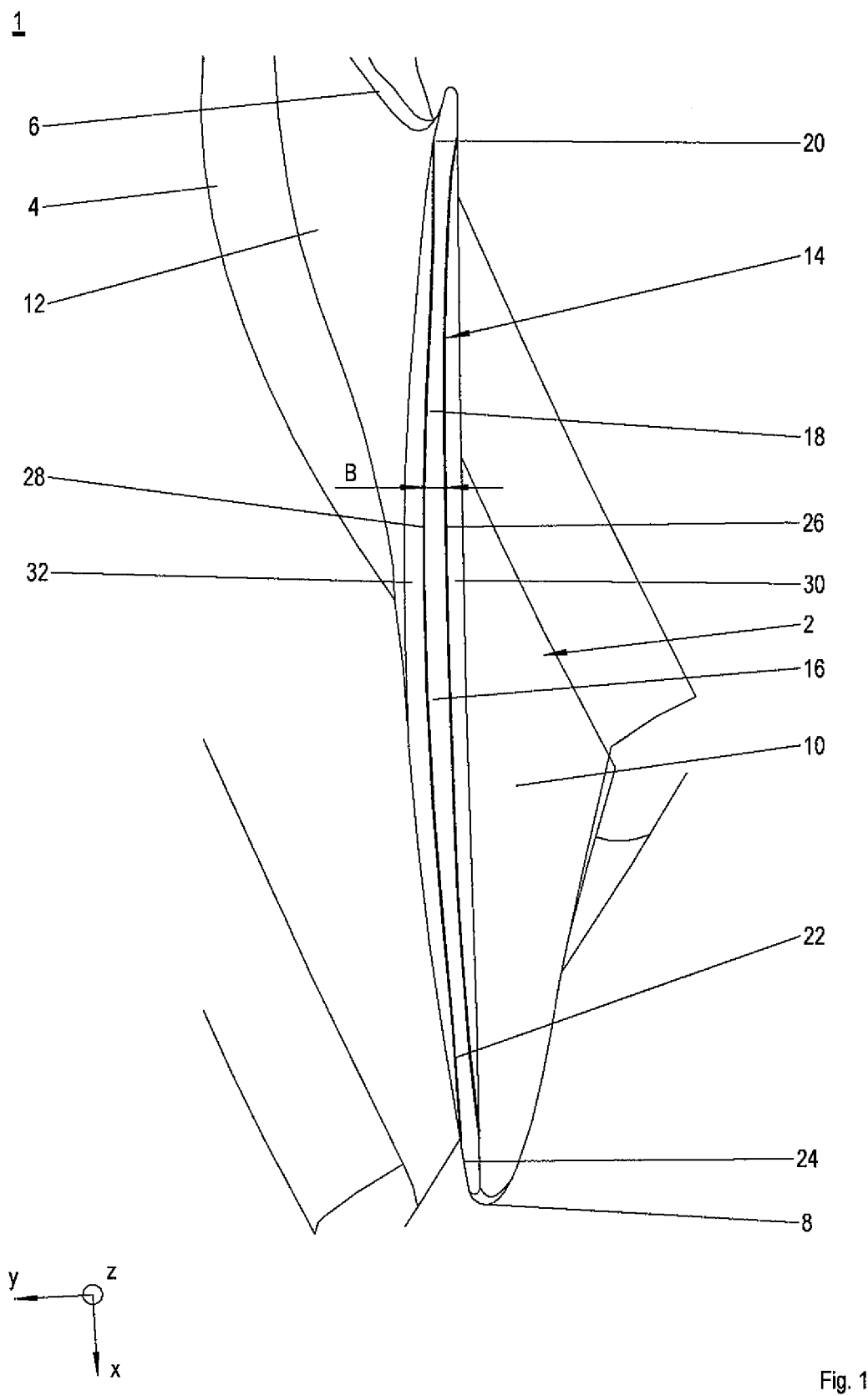
FIG. 1 a first embodiment of a runner blade according to the invention, with a blade tip that is tapered on both sides, from a bird's eye view, FIG. 2 a pressure-side view of the blade of FIG. 1 in the area of the blade tip, FIG. 3 a suction-side view of the blade of FIG. 1 in the area of the blade tip, FIG. 4 a cross section through the blade of FIG. 1 in the area of the blade tip, FIGS. 5 and 6 cross sections through blades in the area of the blade tip, with additional examples of blade tips that are tapered on both sides, and FIGS. 7 to 12 cross sections through blades in the area of the blade tip, with examples of blade tips that are tapered on one side.

FIG. 1 shows a top view of a runner blade 1 of a continuous-flow machine in the main direction z. The runner blade 1 can be arranged on the turbine side as well as on the compressor side. For example, the runner blade 1 having identical blades forms a row of runner blades of a high-pressure compressor. The continuous-flow machine is preferably an axial continuous-flow machine and especially an aircraft engine.

The runner blade 1 has a blade 2 that extends from a platform 4 in the main direction z of the runner blade 1. The blade 2 has a leading edge 6 and a trailing edge 8 opposite from it which run in the main direction z and are at a distance from each other in the lengthwise direction x of the runner blade 1. A pressure-side wall 10 as well as a suction-side wall 12 opposite from the pressure-side wall 10 extend between the leading edge 6 and the trailing edge 8. The pressure-side wall 10 and the suction-side wall 12 form a blade profile and are delimited in the main direction z by a blade tip 14.

The blade tip 14 has a middle section 16, a front partial section 18 as seen upstream from the blade inflow, a front end section 20, a rear partial section 22 as seen downstream from the blade inflow, as well as a rear end section 24. The sections 16, 18, 20, 22, 24 are preferably on a skeleton line of the blade 2 and extend in the crosswise direction y symmetrically or approximately symmetrically thereto.

The middle section 16 is arranged in the middle between the leading edge 6 and the trailing edge 8. The front partial section 18 extends upstream from the middle section 16 and makes a transition into the front end section 20 that forms the leading edge 6. The rear partial section 22 extends downstream from the middle section 16 and makes a transition into the rear end section 24 that forms the trailing edge 8.

The partial sections 18, 22 taper—with respect to the middle section 16 and starting from it—in the direction of their appertaining end sections 20, 24 in the crosswise direction y, and consequently, their cross sections gradually decrease. Thus, they have their largest crosswise extension or width B in the area of the middle section 16, and their smallest crosswise extension or width B directly at the end sections 20, 24. Moreover, the cross section of the middle section 16 is gradually reduced with respect to the pressure-side wall 10 as well as to the suction-side wall 12 in the direction of the leading edge 6 and of the trailing edge 8 respectively. In particular, the middle section 16 and the partial sections 18, 22 according to the top view in FIG. 1 together form a wing-like profile having a concave side surface 26 on the pressure side and an opposite convex side surface 28 on the suction side whose crosswise distance, starting from the middle section 16 whose cross section has already been tapered, is further reduced upstream and downstream uniformly or essentially symmetrically with respect to the skeleton line.

The end sections 20, 24 are not tapered with respect to the pressure-side wall 10 and to the suction-side wall 12. They each accommodate the blade profile of the pressure-side wall 10 and of the suction-side wall 12 and thus have an arrow-like shape as shown in a top view in the depiction of FIG. 1. Since the partial sections 18, 22 and thus the maximum cross sectional tapering of the blade tip 14 are positioned very close to the leading edge 6 and to the trailing edge 8, the end sections 20, 24 are configured to be very short, as seen in the lengthwise direction x. Preferably, the partial sections 18, 22 make a transition into the end sections 20, 24 via rounded sections that do not have reference numerals. Due to the two-sided tapering of the middle section 16 as well as of the partial sections 18, 22, stepped surfaces 30, 32 are created laterally and they extend orthogonally or almost orthogonally to the pressure-side wall 10 as well as to the suction-side wall 12 in this embodiment. Thus, the stepped surfaces 30, 32 are flat and without any contour.

Figure 2:
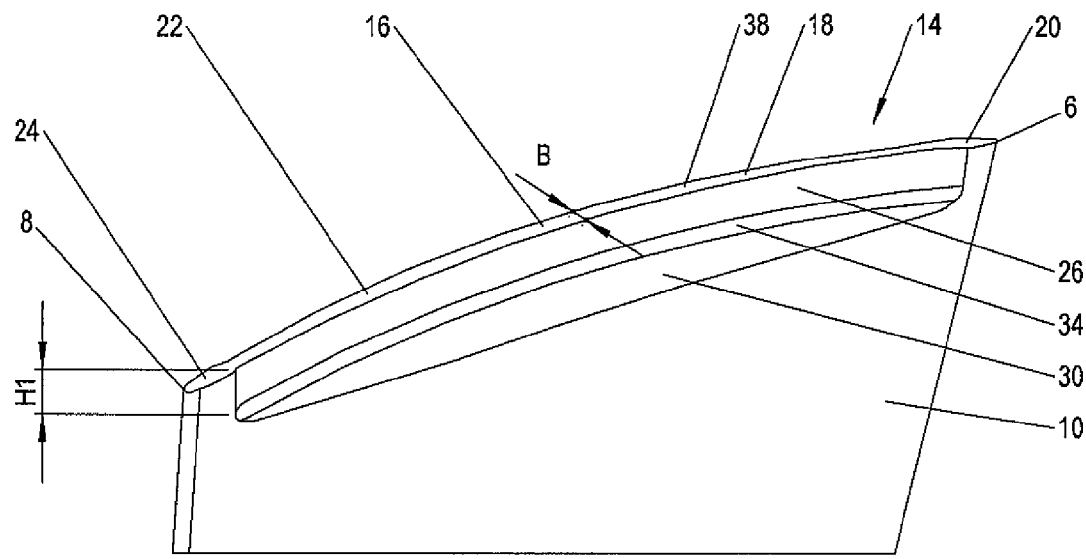
Figure 3:
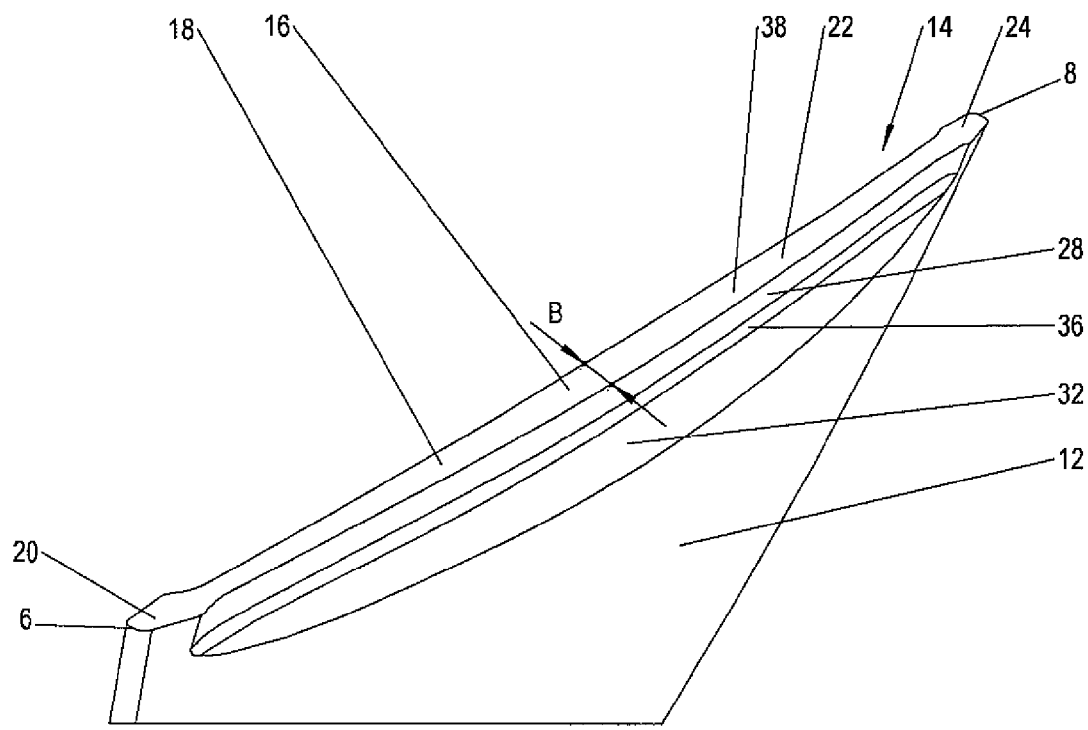
Figure 4:
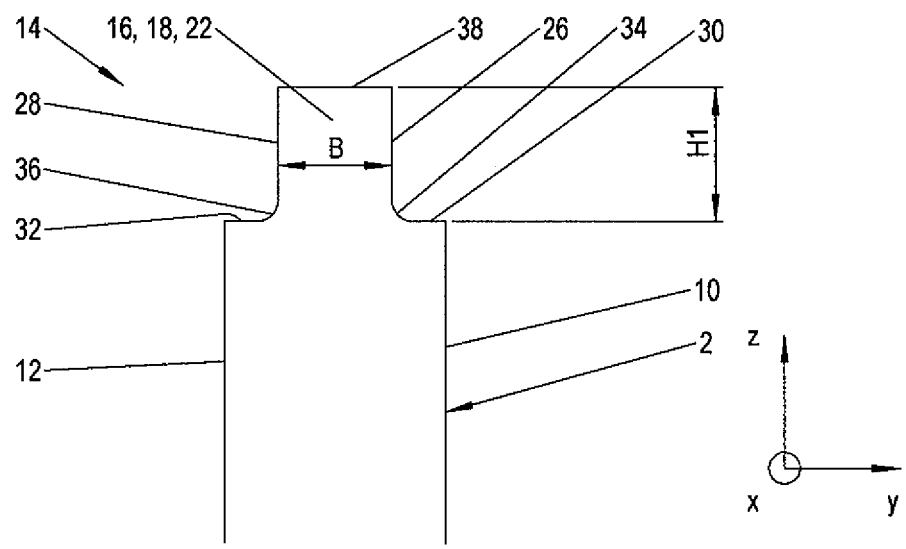

As shown in FIGS. 2 and 3, the side surfaces 26, 28 extend perpendicularly from the appertaining stepped surface 30, 32. As a result, the side surfaces 26, 28 are straight as seen in the main direction z and thus configured to be steep. From the standpoint of structural mechanics, a small radius is removed, preferably in the transition section 34, 36 of the stepped surfaces 30, 32 to the appertaining side surface 26, 28. Moreover, as is shown in FIGS. 2 and 3, the side surfaces 26, 28 have a constant height $H_1$. The middle section 16 and the partial sections 18, 22 have a planar head surface 38 that runs orthogonally to these sections and that extends beyond the end sections 20, 24 to the leading edge 6 and to the trailing edge 8. Thus, the blade tip 14 has the constant height $H_1$ over all of its sections 16 to 24. Since the stepped surfaces 30, 32 are configured to be flat, they do not contribute to the height $H_1$. As indicated in FIG. 4, the width B of the middle section 16 that varies in the lengthwise direction x and of the two partial sections 18, 22 remains constant as seen in the main direction z. The width B varies only in the lengthwise direction x, whereby it decreases over the partial sections 18, 22 in the direction of the leading edge 6 and of the trailing edge 8, starting from the middle section 16 that is tapered with respect to the pressure-side wall 10 and to the suction-side wall 12.

Figure 5:
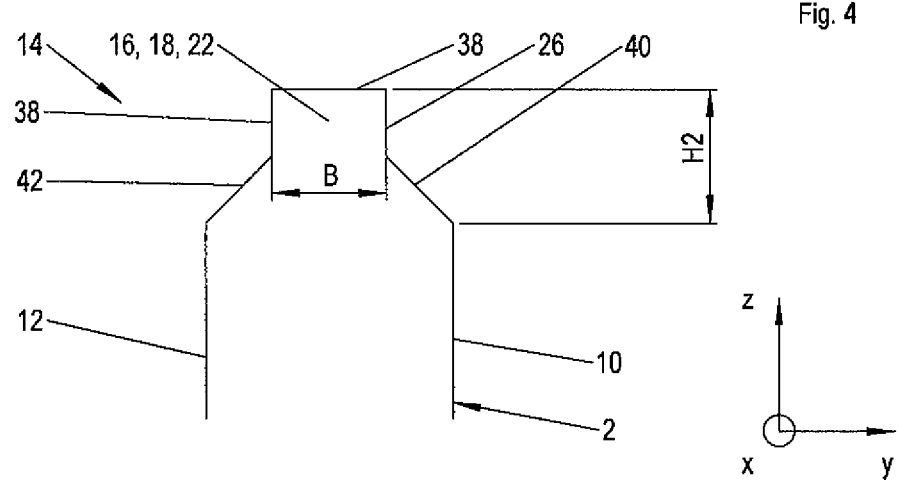

FIG. 5 shows a cross section of a runner blade 1 according to the invention, having a blade tip 14 shown by way of an example, which is tapered on the pressure side as well as on the suction side. In contrast to the preceding first embodiment according to FIGS. 1 to 4, in this embodiment, side surfaces 26, 28 each extend from a slanted surface 40 on the pressure side and from a slanted surface 42 on the suction side respectively, and not from stepped surfaces 30, 32. The slanted surfaces are connected directly to the pressure-side wall 10 and to the suction-side wall 12, so that they make a direct transition into the slanted surfaces 40, 42. The orientation of the side surfaces 26, 28 remains unchanged as compared to the first embodiment according to FIGS. 1 to 4, so that, while the blade height remains unchanged, the side surfaces 26, 28 are configured so as to be smaller or shorter as compared to the first embodiment. The slanted position of the slanted surfaces 40, 42 and the reduced height of the side surfaces 26, 28 are selected in such a way that a height $H_2$ of the blade tip 14 is equal to the height $H_1$ of the first embodiment. Thus, the pressure-side wall 10 and the suction-side wall 12 in these two embodiments have the same extension in the main direction z. The head surface 38 according to the first embodiment is configured as an orthogonal planar surface.

Figure 6:
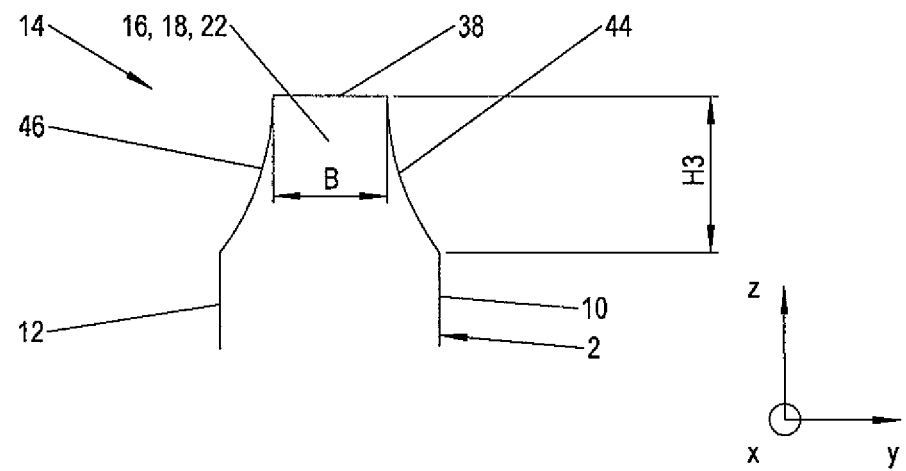

FIG. 6 shows the cross section of a runner blade 1 according to the invention, having a blade tip 14 by way of example that has neither stepped surfaces 30, 32 nor slanted surfaces 40, 42. In contrast to the preceding first and second embodiments, the side surfaces of the middle section 16 and of the partial sections 18, 22 are configured as concave surfaces 44, 46 extending in the crosswise direction y and in the main direction z. The concave surfaces 44, 46 extend directly from a pressure-side wall 10 and from a suction-side wall 12, and they preferably have a constant radius. The radius is such that its tangents in the area of a preferably planar head surface 38 run in the main direction z. Based on the relatively large radius, the height $H_3$ of the blade tip 14 is greater than the heights $H_1$, $H_2$ of the first and second embodiments in order to establish an adequate tapering of the cross section. However, since the blade 2 has a constant blade height, the pressure-side wall 10 and the suction-side wall 12 are configured lower or shortened in the main direction z as compared to the first and second embodiments.

FIGS. 7 to 12 each show an embodiment in which blade tips 14 are provided on one side, that is to say, either on the pressure side or on the suction side, with a tapering or width B that varies according to the invention in the lengthwise direction x. All of the one-sided blade tips 14 have a front partial section 18 whose cross section tapers with respect to the middle section 16 in the direction of a leading edge 6 as well as a rear partial section 22 whose cross section tapers in the direction of a trailing edge 8. Likewise, the cross section of the middle section 16 tapers with respect to a pressure-side wall 10 or a suction-side wall 12 in the direction of the leading edge 6 and of the trailing edge 8. Analogously to the two-sided embodiments according to FIGS. 1 to 7, the cross sections of the end sections 20, 24 of the blade tip 14 are not tapered. The cross sections of the end sections 20, 24 of the blade tip 14, which are not tapered, each continue a blade profile on the pressure side or on the suction side.

Figure 7:
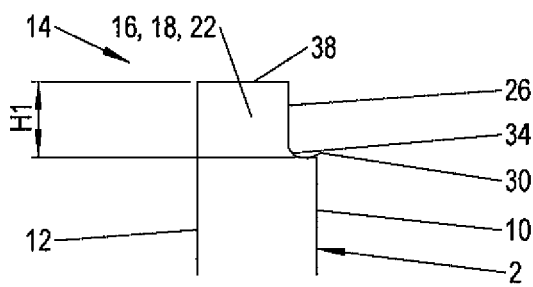
Figure 7:
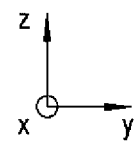

FIG. 7 shows a blade tip 14 that is tapered only on the pressure side and that has an orthogonal stepped surface 30 on the pressure side as well as a side surface 26 on the pressure side extending perpendicularly from said stepped surface 30 or else running straight in the main direction z. The blade tip 14 has the blade profile on the suction side.

Figure 8:
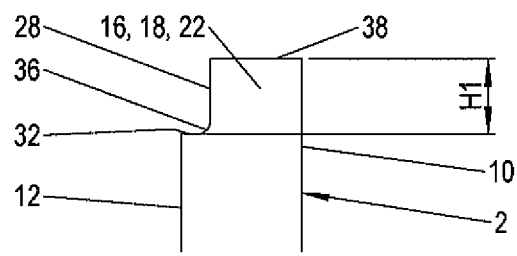
Figure 8:
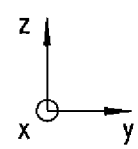

FIG. 8 shows a blade tip 14 that is only tapered on the suction side and that has an orthogonal stepped surface 32 on the suction side and a side surface 28 running straight on the suction side. The blade tip 14 has the blade profile on the pressure side.

Figure 9:
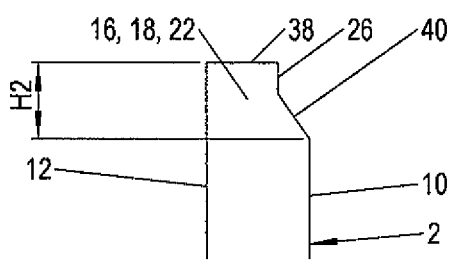
Figure 9:
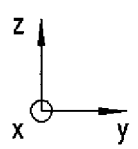

FIG. 9 shows a blade tip 14 which is tapered only on the pressure side and in which the pressure-side wall 10—via a slanted surface 40 on the pressure side—makes a transition to a straight side surface 26 on the pressure side. The blade tip 14 has the blade profile on the suction side.

Figure 10:
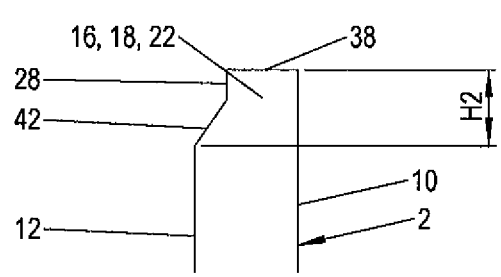
Figure 10:
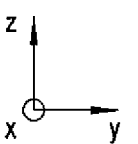

FIG. 10 shows a blade tip 14 which is only tapered on the suction side and in which the suction-side wall 12—via a slanted surface 42 on the suction side—makes a transition to a straight side surface 28 on the suction side. The blade tip 14 has the blade profile on the pressure side.

Figure 11:
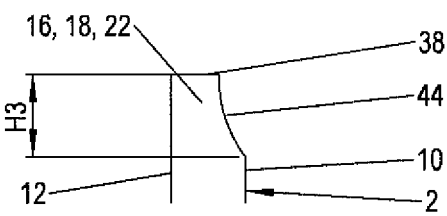
Figure 11:
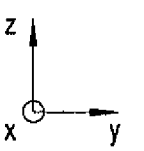

FIG. 11 shows a blade tip 14 which is only tapered on the pressure side and which, instead of a straight side surface 26 in combination with a stepped surface 30 or a slanted surface 40, has a concave surface 44 on the pressure side extending in the crosswise direction y and in the main direction z. The blade tip 14 has the blade profile on the suction side.

Figure 12:
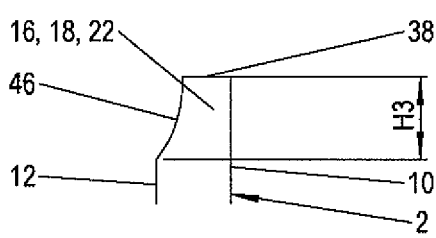
Figure 12:
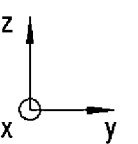

FIG. 12 shows a blade tip 14 that is only tapered on the suction side and that has a concave surface 46 on the suction side. The blade tip 14 has the blade profile on the pressure side.

In addition to the embodiments shown in the preceding figures, of course, other blade tip geometries are possible that are likewise encompassed by the scope of protection of the patent claims. For example, it is conceivable for only the partial section 18, 20 to be configured with tapered cross sections on one side or on both sides along the lengthwise direction x, and for the middle section 16 to be configured without a tapered cross section, but rather for the blade profile to be extended beyond the middle section 16.

A runner blade for a continuous-flow machine is disclosed, especially for an aircraft engine, whereby, starting from the middle section, the cross section of the blade tip is reduced with respect to the middle section, at least over a front partial section in the direction of the leading edge and over at least a rear section in the direction of the trailing edge, and moreover, a continuous-flow machine having at least one row of blades having such blades is also disclosed.

LIST OF REFERENCE NUMERALS 1 runner blade
2 blade
4 platform
6 leading edge
8 trailing edge
10 pressure-side wall
12 suction-side wall
14 blade tip
16 middle section
18 front partial section
20 front end section
22 rear partial section
24 rear end section
26 side surface
28 side surface
30 stepped surface
32 stepped surface
34 transition section
36 transition section
38 head surface
40 slanted surface
42 slanted surface
44 concave surface
46 concave surface
B width
$H_1$, $H_2$, $H_3$ height
z main direction
x lengthwise direction
y crosswise direction

What is claimed is:

1. A runner blade for a continuous-flow machine, the runner blade comprising:
a blade with a leading edge and a trailing edge opposite from it, both the leading edge and the trailing edge extending in a main direction of the runner blade and being at a distance from each other in a lengthwise direction of the runner blade, the blade having a pressure-side wall extending between the leading edge and the trailing edge as well as a suction-side wall opposite from the pressure-side wall, the blade having a tip delimiting the pressure-side wall and the suction-side wall in the main direction, the blade tip defining a middle section arranged between the leading edge and the trailing edge, a front partial section in the direction of the leading edge, a front end section transitioning into the leading edge, a rear partial section in the direction of the trailing edge, and a rear end section transitioning into the trailing edge, a cross section of the blade tip at the middle section being reduced with respect to at least one of the pressure-side wall and the suction-side wall away from the blade tip; and, starting from the middle section, the cross section of the blade tip is gradually reduced with respect to the middle section, in each case at least over the front partial section in the direction of the leading edge and at least over the rear partial section in the direction of the trailing edge, each of the front end section and the rear end section continuing a profile course of the suction-side wall and of the pressure-side wall away from the blade tip.

2. The runner blade as recited in claim 1 wherein the cross section of the blade tip at the middle section is reduced with respect to both the pressure-side wall and the suction-side wall away from the blade tip.

3. The runner blade as recited in claim 2 wherein the middle section and the front and rear partial sections have two side surfaces facing away from each other, the side surfaces, on a pressure side as well as on a suction side, extending perpendicularly from a stepped surface running orthogonally to the pressure-side wall and to the suction-side wall.

4. The runner blade as recited in claim 2 wherein the middle section and the front and rear partial sections have two side surfaces facing away from each other, the side surfaces extending from a slanted surface on the pressure side and from a slanted surface on the suction side.

5. The runner blade as recited in claim 2 wherein the middle section and the front and rear partial sections have two side surfaces facing away from each other, the side surfaces are configured as concave surfaces.

6. The runner blade as recited in claim 2 wherein the middle section and the front and rear partial sections have two side surfaces facing away from each other, the side surfaces being connected to each other via a planar surface on a head side of the tip.

7. The runner blade as recited in claim 1 wherein the cross sections of the blade tip at the middle section and at the front and rear partial sections is reduced with respect to both the pressure side wall and the suction side wall away from the blade tip.

8. The runner blade as recited in claim 1 wherein the middle section and the front and rear partial sections form a wing-like profile.

9. The runner blade as recited in claim 1 wherein the blade tip has a constant extension in the main direction.

10. A continuous-flow machine comprising at least one row of blades including a plurality of runner blades as recited in claim 1.

11. An aircraft engine comprising the continuous-flow machine as recited in claim 10.

12. The runner blade as recited in claim 1 wherein the cross section of the blade tip at the middle section is reduced with respect to solely the pressure-side wall.

13. The runner blade as recited in claim 1 wherein the cross section of the blade tip at the middle section is reduced with respect to solely the suction-side wall.

* * * * *